UNITED STATES PATENT OFFICE 2,117,707

AZO DYE

Herbert W. Daudt, Wilmington, Del., assignor to E. I. du Pont de Nemours & Company, Wilmington, Del., a corporation of Delaware No Drawing. Application January 22, 1937, Serial No. 121,821

4 Claims. (Cl. 260—84)

This invention relates to azo dyes, and especially to new dyes which are produced by diazotization and with coupling of the compounds 4-nitro-2-amino-phenol, resorcin and 1-naphthylamine-5-sulphonic acid.

Heretofore dyes suitable for dyeing wool were made by coupling diazotized 1-naphthylamine-6 or -7 sulphonic acid with the azo compound formed by coupling diazotized 4-nitro-2-amino-phenol with resorcin. Wool dyeings were also made with dyes which were formed by coupling diazotized 1-naphthylamine-5-sulphonic acid with the azo compound formed by coupling diazotized 4-nitro-2-amino-phenol with m-phenylenediamine. Although these compounds are excellent dyes, giving reddish brown shades in chromed dyeings on animal fibres, they are not satisfactory when deeper reddish shades are wanted, and it has been found desirable to provide dyes for wool which can be used to produce deeper red shades.

It is among the objects of the invention to provide new dyes for animal fibres which can be used to produce deep reddish brown shades. Another object of the invention is to provide dyes of the kind which produce deeper shades of red in chromed dyeings than are produced by the dyes heretofore described.

Another object of the invention is to provide processes for making the dyes. Other objects of the invention are to provide animal fibers dyed with the dyestuff and methods of dyeing the same.

The objects of the invention are accomplished generally by coupling resorcin with diazotized 4-nitro-2-amino-phenol and with diazotized 1-naphthylamine-5-sulphonic acid in successive coupling procedures, either of which coupling operation may precede the other.

The invention is illustrated but not limited by the following.

Example I

A mixture containing 308 parts of 4-nitro-2-amino phenol, 220 parts of 36.5% hydrochloric acid and 1500 parts of water was cooled to 0° C. with 1600 parts of ice and 138 parts of sodium nitrite were added during a period of 15 to 20 minutes. A solution containing 220 parts of resorcin dissolved in 3000 parts of water was cooled to 15° C. with ice and added to the diazo solution gradually during a period of about 15 minutes. Then 80 parts of sodium bicarbonate in water solution were gradually added during the next hour. The reaction mass was allowed to cool to room temperature, say 20° to 25° C. and was stirred for an additional 16 hours to complete the coupling reaction.

491 parts of 1-naphthylamine-5-sulphonic acid were dissolved in a sodium hydroxide solution containing 88 parts of sodium hydroxide and 4000 parts of water. The solution was well stirred and acidified by adding 550 parts of 36.5% hydrochloric acid and cooled to about 5° C. by adding 2000 parts of ice. A concentrated aqueous solution of sodium nitrite containing 160 parts of sodium nitrite was then added. After the diazotization was complete the mixture which had become heated to about 16° was cooled to about 5° C. with ice and the diazotized mass was treated with 88 parts of sodium bicarbonate.

The reaction mixture containing the products of the first coupling was prepared for the final coupling by cooling to about 5° C. with about 2000 parts of ice and made alkaline by first adding a solution of sodium hydroxide containing 120 parts of sodium hydroxide and 250 parts of water and then adding a solution of sodium carbonate containing 212 parts of sodium carbonate and 2500 parts of water. To this solution the mixture of diazotized 1-naphthylamine-5-sulphonic acid was added, the temperature of the reaction mixture being about 12° C. and the reaction mass being alkaline to brilliant yellow. The reaction mixture was stirred for about 1 hour and then heated to 85° C. About 240 parts of sodium hydroxide were then added until the suspended mixture was completely dissolved. About 5000 parts of sodium chloride were then added and the stirring was continued for 17 hours at room temperature. Finally about 510 parts of sodium bicarbonate were added to the stirred mass and after stirring for one hour the suspended dye was separated by filtering, dried at 50° C. and ground to a light brown powder. The product is represented by the following formula.

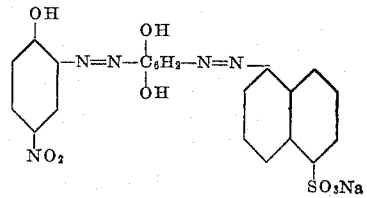

The dye was used to dye wool in an acid bath by known procedure. For 100 parts of wool skein the bath contained one part of dye and about 6 parts of acetic acid to about 100 parts of water. The skein was given chroming treatment after adding to the dye solution about one part of sodium bichromate crystals dissolved in 25 parts of water and 2 parts of acetic acid. The direct dyeing was yellow in shade and the chromed dyeing was reddish brown in shade. The chromed dyeing was a richer and deeper red than was obtained by dyeing wool in a similar manner with dyes made from 1-naphthylamine-6- or -7-sulphonic acid or those made with m-phenylamine diamine as the coupling component. The dye was similarly applied to other animal fibres, such as leather.

Instead of coupling resorcin with diazotized 4-nitro-2-amino-phenol, the order of coupling can be reversed. For example, the resorcin can be coupled with diazotized 1-naphthylamine-5-sulphonic acid and this azo compound may then be coupled with the other diazotized component by methods similar to those described in the foregoing example. Modifications in the procedure, such as changes in concentration of the reacting media, temperature, proportions of reacting components and pH value of the solutions can be made as those skilled in the art will understand. About one equivalent of resorcin and one equivalent of each of the diazo components is usually used but this proportion may be changed to obtain products of slightly different composition and properties.

Other modifications of the invention not specifically pointed out but apparent to those skilled in the art may be made without departing from the spirit and scope of the invention, and it is to be understood that no limitations are intended except those which are specifically recited in the annexed claims or are imposed by the prior art.

I claim:

1. The dye produced by coupling resorcin with diazotized 4-nitro-2-amino-phenol and diazotized 1-naphthylamine-5-sulfonic acid and which in the form of its acid is represented by the formula

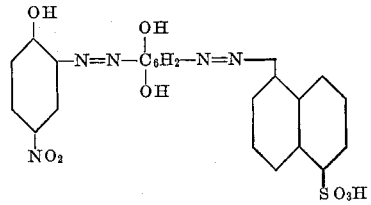

2. The process which comprises coupling diazotized 4-nitro-2-amino phenol with resorcin in alkaline reaction medium, and then coupling said product of coupling in alkaline reaction medium with diazotized 1-naphthylamine-5-sulphonic acid.

3. The process which comprises coupling diazotized 4-nitro-2-amino phenol with resorcin in alkaline reaction medium, and then coupling said product of coupling in alkaline reaction medium with diazotized 1-naphthylamine-5-sulphonic acid, said compounds being coupled in equimolecular proportions.

4. Animal fibre dyed with a compound resulting from dyeing the fibre with the product made by coupling resorcin with diazotized 4-nitro-2-amino phenol and diazotized 1-naphthylamine-5-sulphonic acid, and then chroming the dyed material.

HERBERT W. DAUDT.